United States Patent [19]
Allen et al.

[11] 3,937,303
[45] Feb. 10, 1976

[54] FRICTION PLATES

[75] Inventors: Brian Robert Allen; Anthony William Harrison, both of Birmingham, England

[73] Assignee: Girling Limited, Birmingham, England

[22] Filed: May 17, 1974

[21] Appl. No.: 470,922

[30] Foreign Application Priority Data
May 19, 1973 United Kingdom............... 23965/73

[52] U.S. Cl. ...... 188/73.2; 188/218 XL; 188/251 R; 192/107 R
[51] Int. Cl.² ......................................... F16D 69/04
[58] Field of Search............. 188/73.1, 73.2, 251 A, 188/251 M, 218 XL, 251 R; 192/107 R

[56] References Cited
UNITED STATES PATENTS

| | | | |
|---|---|---|---|
| 2,089,080 | 8/1937 | Valentine | 188/251 M |
| 2,818,634 | 1/1958 | Batchelor et al. | 188/251 M |
| 2,835,367 | 5/1958 | Steck | 192/107 R |
| 2,892,707 | 6/1959 | Biggs | 188/251 M |
| 2,947,388 | 8/1960 | Culbertson | 188/218 XL |
| 3,014,884 | 12/1961 | Bray | 188/251 M |
| 3,033,326 | 5/1962 | Byers | 188/73.1 |

FOREIGN PATENTS OR APPLICATIONS
864,769   4/1961   United Kingdom........... 188/251 A OTHER PUBLICATIONS
*Cerametalix*, Bendix Corporation; Troy, New York, Feb. 19, 1957.

*Primary Examiner*—George E. A. Halvosa
*Assistant Examiner*—Edward R. Kazenske
*Attorney, Agent, or Firm*—Kane, Dalsimer, Kane, Sullivan and Kurucz

[57] ABSTRACT

A friction plate for use, inter alia in a vehicle disc brake includes a metal backing plate and a plurality of friction pads carried by the backing plate on one major surface thereof. The friction pads are arranged on one major surface in first and second, circular rows which bound respectively first and second concentric, circular annuli. The external diameter of the first annulus is less than the external diameter of the second annulus, but is greater than the internal diameter of the second annulus so that the annuli overlap.

4 Claims, 2 Drawing Figures

FRICTION PLATES

This invention relates to friction plates for use, inter alia, in disc brakes for vehicles.

A friction plate, according to the invention, includes a metal backing plate and a plurality of friction pads carried by the backing plate on one major surface thereof, the friction pads being arranged on said one surface in first and second, circular rows which bound respectively first and second concentric, circular annuli, the external diameter of the first annulus being less than the external diameter of the second annulus, but greater than the internal diameter of the second annulus so that the annuli overlap.

Preferably, the friction pads of said first row alternate with the pads of said second row.

Preferably, the number of friction pads in the second row exceeds the number of pads in the first row.

Figure 1:
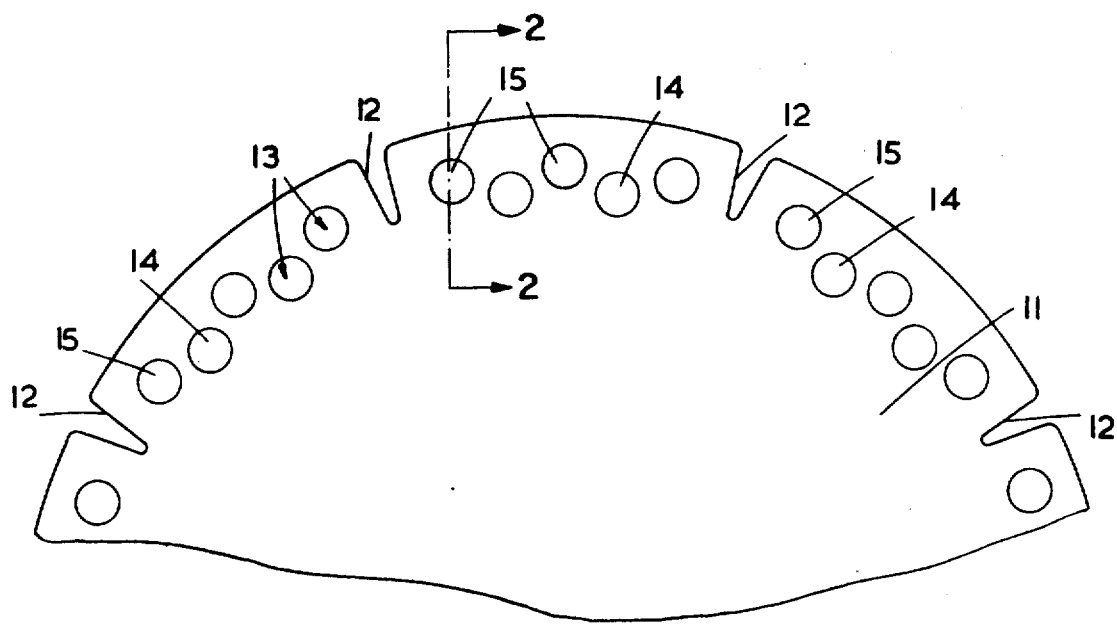
Figure 2:
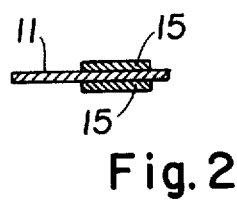

Preferably, each friction pad is aligned with an identical further friction pad on the other major surface of the backing plate. In the accompanying drawings, FIG. 1 is a plan view of part of a friction plate according to one example of the invention, and FIG. 2 is a sectional view along the line 2—2 in FIG. 1.

Referring to the drawing, the friction plate includes a mild steel disc 11 having a diameter of 8.8 inches and a thickness of 0.125 inch. Extending radially inwardly into the disc 11 from the periphery thereof are eight equiangularly spaced slots 12 (only four shown in the drawing), of length 0.625 inch and width 0.125 inch. On each major surface of the disc 11, there is provided a plurality of angularly spaced friction pads 13 positioned adjacent the periphery of the disc 11 and between the slots 12, so that there are five friction pads between adjacent slots. Also, the arrangement is such that each friction pad 13 on one major surface of the disc is aligned with a respective friction pad on the opposite major surface of the disc. Each friction pad has a thickness of about 0.05 inch and is circular in plan with its diameter being 0.6 inch, the distance between adjacent friction pads being about 0.04 inch.

The friction pads on each major surface of the disc 11 are arranged in first and second rows 14, 15 respectively which contain sixteen and twenty-four pads respectively and which extend continuously around the disc 11 so as to bound first and second concentric, circular annuli respectively as shown, the friction paths in each of the first and second rows have their centers disposed at a constant radial distance from the center of disc 11. The external diameter of the first annulus is less than the external diameter of the second annulus, which is in turn less than the external diameter of the disc 11 by between 0.025 and 0.03 inch. However, the external diameter of the first annulus is greater than the internal diameter of the second annulus so that the annuli overlap by an amount such that the radial distance between the internal periphery of the first annulus and the external periphery of the second annulus is greater than 0.8 inch and less than 1.2 inch, and preferably is 0.96 inch. Moreover, by varying the overlap between the rows 13, 14 within these limits, it is possible to vary the braking characteristics of the friction plate.

To produce the friction plate shown in the drawing, a powdered friction material is first produced having the following composition by weight: 60% copper, 12% tin, 2% lead, 9% zinc, 4% carbon and 13% silica. The friction material is produced by mixing together the components in a Nautamix mixer for approximately 30 minutes, whereafter the material is removed from the mixer and then re-mixed for a further 30 minutes to ensure uniform distribution of the components. This mixture is to be used to produce the friction pads 13 and, for each pad 1.3gm of the mixture is placed in a suitably shaped die cavity and compressed into a pellet at 17000 lb.f.

The compacted pellets are then secured in the required positions on opposite sides respectively of the disc 11 by a resistance heating operation, which also serves to sinter the compacts into the required friction pads 13. To provide the required bond between the disc 11 and the pads 13, the disc is plated, prior to the heating operation, with a 0.001 inch thicklayer of a brazing material, such as copper, brass, bronze, nickel, tin, zinc, and tin/zinc. A pair of molybdenum-tipped electrodes are used to effect the resistance heating operation, which conveniently involves applying a force of 160 lb. to the compacts and passing a current of 5700amps between the electrodes for 11 seconds. The electrodes may be arranged so that each resistance heating operation serves to sinter and bond to the disc 11 a pair of compacts aligned on opposite sides respectively of the disc. Alternatively, the electrodes may be arranged so that a plurality of aligned compacts, such as those defined between a pair of adjacent slots 12, are sintered and bonded to the disc 11 at each resistance heating operation; such electrodes could progressively move round the disc until all the pads had been joined, or, a plurality of such electrodes could join all the pads of the assembly in one operation.

Obviously, depending upon the size of the disc and the number of pads, involved, it would be possible to sinter and bond all the pads with single electrodes in one operation.

While in the example the pads of the first row alternate with the pads of the second row, it would be possible to alternate groups of pads of the first row with groups of pads of the second row e.g. the groups being defined between the adjacent slots 12.

It is to be appreciated, that although in the example described the friction pads 13 are circular in plan, the pads could be of different configuration (e.g. rectangular in plan) depending on the braking characteristics required. Also, although in the above example the circular pads 13 of the first and second rows 14, 15 are of equal diameter, the pads 13 of the two rows could have different diameters.

Moreover, it is to be appreciated that the exposed major surface of the friction pads 13 may be grooved in the same manner as the friction pads of conventional friction plates. Thus, said major surfaces may be formed with annular grooves of relatively large width, conventionally termed wagon tracks, as well as relatively narrow, concentric or spiral grooves.

We claim:

1. A friction plate including a metal backing plate and a plurality of friction pads carried by the backing plate on one surface thereof, all the friction pads on said one surface of the backing plate being contained in first and second, circular rows which extend around said one surface of the backing plate and which bound respectively first and second concentric, circular annuli, the external diameter of the first annulus being less than the external diameter of the second annulus but greater than the internal diameter of the second annulus so that the annuli overlap, and the friction pads in each of said first and second rows having their centers disposed at a constant radial distance from the center of the backing plate, but the number of said friction pads in the second row exceeding the number of said friction pads in the first row.

2. A plate as claimed in claim 1 wherein the friction pads of said first row alternate with the pads of said second row.

3. A plate as claimed in claim 1 wherein each friction pad is aligned with an identical further friction pad on the other major surface of the backing plate.

4. A plate as claimed in claim 1 wherein the friction pads are produced from compacts of friction material which are resistance heated on the backing plate, the heating serving to sinter the compacts into the friction pads and to bond the pads to the backing plate.

* * * * *